United States Patent
Chang

(10) Patent No.: US 7,768,597 B2
(45) Date of Patent: Aug. 3, 2010

(54) LIQUID CRYSTAL DISPLAY

(75) Inventor: Ching-Chao Chang, Taipei (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 666 days.

(21) Appl. No.: 11/610,554

(22) Filed: Dec. 14, 2006

(65) Prior Publication Data

US 2008/0143897 A1 Jun. 19, 2008

(51) Int. Cl.
*G02F 1/1335* (2006.01)

(52) U.S. Cl. .......................... 349/106; 349/141

(58) Field of Classification Search .................. None
See application file for complete search history.

(56) References Cited

U.S. PATENT DOCUMENTS

| | | | | |
|---|---|---|---|---|
| 6,965,419 B2* | 11/2005 | Nishida et al. | | 349/106 |
| 7,248,314 B2* | 7/2007 | Yun | | 349/108 |
| 2005/0117092 A1* | 6/2005 | Park et al. | | 349/106 |
| 2005/0237447 A1* | 10/2005 | Ono | | 349/106 |
| 2006/0290831 A1* | 12/2006 | You | | 349/56 |

FOREIGN PATENT DOCUMENTS

CN 1690803 A 11/2005

JP 2001264809 9/2001

OTHER PUBLICATIONS

English Language Abstract of CN 1690803, published Nov. 2, 2005.
China Office Action, mailed on related China application on Jan. 16, 2009.
China Office Action mailed Jun. 5, 2009.
English abstract of JP2001264809, pub. Sep. 26, 2001.

* cited by examiner

*Primary Examiner*—David Nelms
*Assistant Examiner*—Lucy P Chien
(74) *Attorney, Agent, or Firm*—Thomas, Kayden, Horstemeyer & Risley

(57) ABSTRACT

A liquid crystal display is disclosed. A first substrate and a second substrate correspond to each other. A plurality of first common electrode and a second common electrode are arranged on the first substrate. A plurality of first pixel electrodes and a second pixel electrode correspond to the first common electrodes and the second common electrode separately, and each of the pixel electrodes includes a plurality of electrode portions having a width l, tilted an angle θ, and separated by a distance w. A plurality of first color units and a second color unit are arranged on the second substrate and correspond to the first pixel electrodes and the second pixel electrode separately, wherein at least one of the width l, the distance w and the angle θ in the first color units is different from that in the second color unit.

19 Claims, 13 Drawing Sheets

LIQUID CRYSTAL DISPLAY

BACKGROUND OF THE INVENTION

1. Field of the Invention

The invention relates to liquid crystal display (LCD) devices, and more particularly to fringe field switching mode liquid crystal display (FFS-LCD) devices.

2. Description of the Related Art

Liquid crystal display (LCD) devices possess the advantages of small size, light weight and low power consumption thus, they offer enhanced portability and applicability to a wide variety of electronic and communication devices including notebook computers, personal digital assistants (PDA), mobile phones and similar. Critical features for large-scale monitors and high-end TV applications include fast response, high contrast ratio, high transparency, and wide viewing angle with no gray scale inversion.

Fringe field switching liquid crystal displays (FFS-LCD) meet the described high quality display feature requirements, and solve the viewing angle problems by orienting the liquid crystal molecules to be parallel with a substrate. Moreover, FFS-LCDs have high a aperture ratio and transmittance.

LCDs typically present images by mixing the three primary colors, red, green and blue. In addition to the three primary colors, a white is also provided to increase transmissive or reflective brightness and thus reduce power consumption. Mixed RGBW LCDs, however, suffer from some drawbacks.

FIG. 1 illustrates a conventional RGBW LCD comprising a first substrate 100, such as an array substrate. A plurality of thin film transistors (TFTs), each comprising a gate, a source and a drain, is formed on the first substrate 100. In this figure, the TFTs and/or other active devices are simplified as an active layer 102. A lower alignment layer 104 is formed on the active layer 102.

A second substrate 106 is opposite the first substrate 100. Red resist patterns R', green resist patterns G' and blue resist patterns B' are formed on an inner side of the second substrate 106 each comprising openings 110. The red resist patterns R', the green resist patterns G' and the blue resist patterns B' can be formed by photolithography. The openings are provided at locations for forming white resist patterns. After forming the R', G', B' resist patterns, a coating layer 112 is blanketly deposited to fill the opening 110, and thereby form the transparent white resist patterns W'. Next, an upper alignment layer 114 is formed on the coating layer 112. Liquid crystals are injected into a space between the upper alignment layer 114 and the lower alignment layer 104 to form a liquid crystal layer 116.

Because the white resist pattern W' is formed by filling gaps in the coating layer 112, non-uniform cell gaps occur. For example, a cell gap d1 corresponding to the white resist pattern W' is larger than another cell gap d2 corresponding to the red resist pattern R', the green resist pattern G', and/or the blue resist pattern B'. Non-uniform cell gaps, however, present non-uniform T-V (transmittance versus voltage) curves. As shown in FIG. 2, different cell gaps, such as 3.5 μm, 4.0 μm, and 4.3 μm, achieve different T-V curves. Accordingly, some optical properties such as contrast ratio and viewing angles may deteriorate in LCDs.

FIG. 3 shows a cross section of a conventional fringe field switching liquid crystal display (FFS-LCD) device 300, which comprises a first substrate 302 and an opposite second substrate 304. A common electrode 308 is formed on the first substrate. An insulating layer 312 is formed on the common electrode 308. A plurality of pixel electrodes 310 are formed on the insulating layer 312. A lower alignment layer 314 is formed to cover the insulating layer 312 and the pixel electrodes 310. A color filter layer 316 and an upper alignment layer 318 are formed on the inner surface of the second substrate 304. A liquid crystal layer 306 is interposed between the upper and the lower alignment layers. The FFS-LCD device achieves wider viewing angle by orienting the liquid crystal molecules 320 of the liquid crystal layer 306 to be parallel with the first and second substrates 302 and 304 using an electric field 322 between the pixel electrodes 310 and the common electrode 308, and further has advantages of high aperture ratio and transmittance. The conventional FFS-LCD device, however, still suffers from non-uniform T-V curve and related issue when incorporating mixed RGBW technology.

BRIEF SUMMARY OF INVENTION

A detailed description is given in the following embodiments with reference to the accompanying drawings. These and other problems are generally solved or circumvented, and technical advantages are generally achieved, by the invention.

Liquid crystal displays are provided. An exemplary embodiment of a display unit comprises a first color unit, a second color unit, a third color unit, and a fourth color unit. A first substrate is disposed opposite a second substrate with a liquid crystal layer interposed therebetween. A common electrode is disposed overlying an inner surface of the first substrate. A pixel electrode is disposed over the common electrode with an insulating layer therebetween, wherein the pixel electrode comprises a plurality of parallel electrode portions, each having a width l, an angle θ from horizontal, and separated with each other by a distance w. A color filter layer is disposed overlying an inner surface of the second substrate. A coating layer is disposed overlying the color filter layer, wherein the liquid crystal display comprises a cell gap between the coating layer and the pixel electrode. The cell gap in the fourth color unit is larger than that in the first color unit, the second color unit and/or the third color unit. At least one of the width l, the distance w and the angle θ in the fourth color unit is different from that in the first color unit, the second color unit and/or the third color unit.

Fringe field switching liquid crystal displays (FFS-LCD) are provided. An exemplary embodiment of an FFS LCD unit comprises a first color unit, a second color unit, a third color unit and a fourth color unit defined by a plurality of gate lines intersecting a plurality of data lines. A first substrate is disposed opposite a second substrate with a liquid crystal layer interposed therebetween. A common electrode is disposed overlying the first substrate. An insulating layer is disposed overlying the common electrode. A pixel electrode is disposed overlying the common electrode. The pixel electrode comprises a plurality of parallel electrode portions, each having a width l, an angle θ from horizontal, and separated from each other by a distance w. A color filter layer is disposed overlying an inner surface of the second substrate. A coating layer is disposed overlying the color filter layer, wherein the liquid crystal display has a cell gap between the coating layer and the pixel electrode. The color filter layer comprises an opening corresponding to the fourth color unit. The coating layer fills the opening and sinks thereby, such that the cell gap in the fourth color unit is larger than that in the first color unit, the second color unit, and/or the third color unit. The width l, the distance w and/or the angle θ in the fourth color unit is adjusted to differ from that in the first color unit, the second color unit and/or the third color unit for achieving uniform transmittance-voltage curves between the fourth color unit and at least one of the first color unit, the second color unit and the third color unit.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
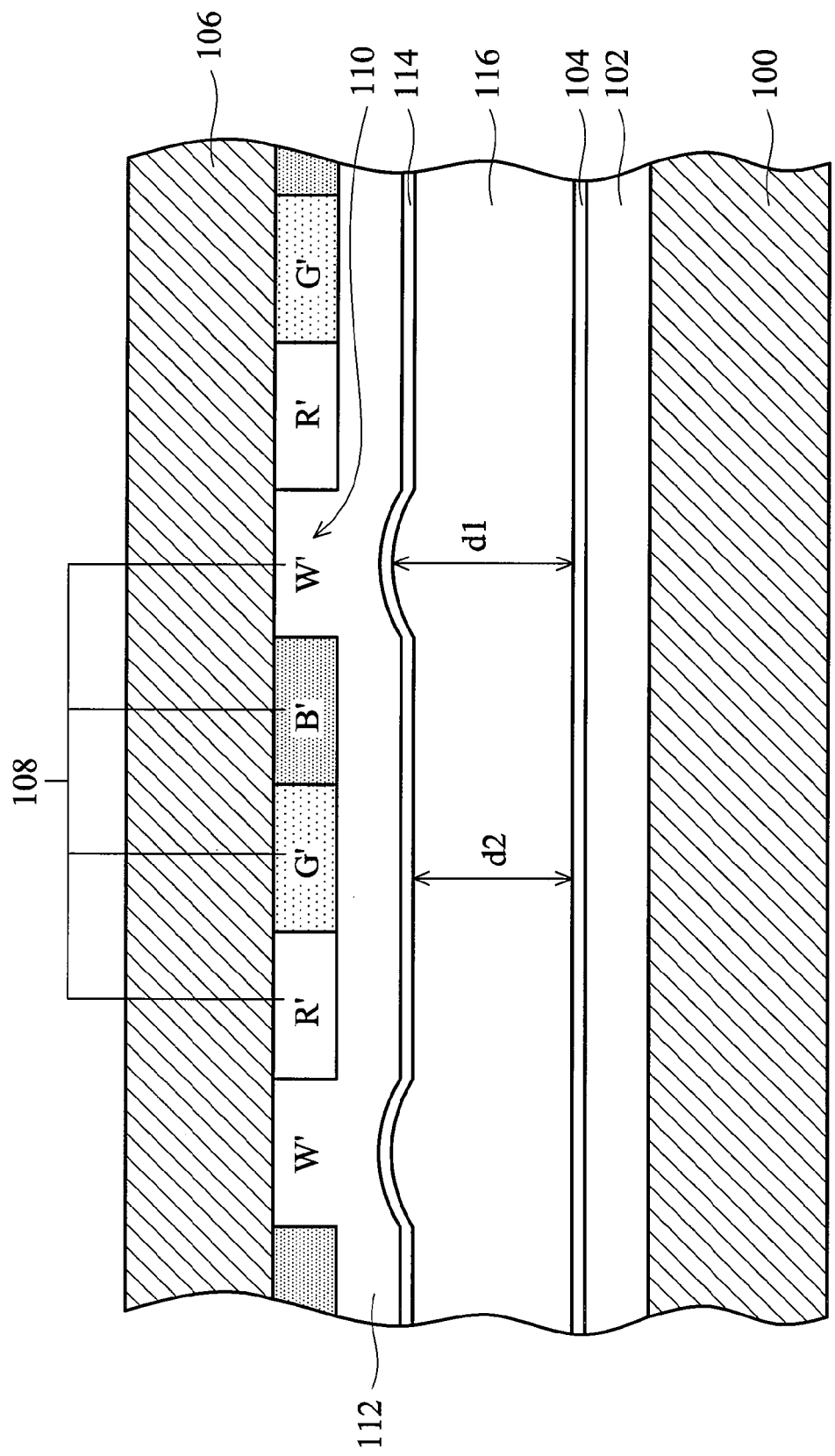
FIG. 1 illustrates a drawback of conventional RGBW LCDs.

The following description is of the best-contemplated mode of carrying out the invention. This description is made for the purpose of illustrating the general principles of the invention and should not be taken in a limiting sense. The scope of the invention is best determined by reference to the appended claims. The invention, which provides a liquid crystal display, will be described in greater detail by referring to accompanying the drawings. In the drawings, like and/or corresponding elements are referred to by like reference numerals.

Figure 4A:
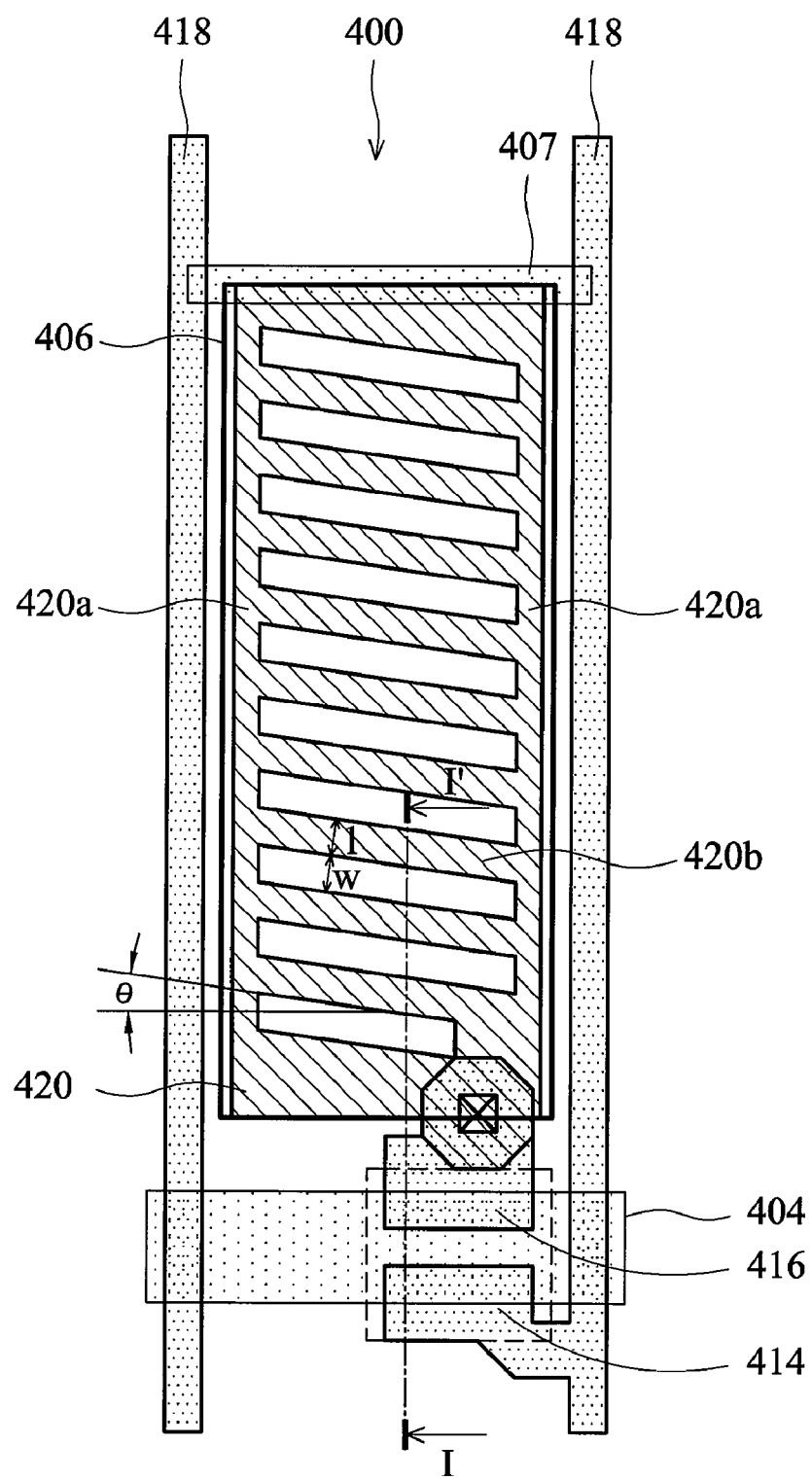
FIG. 4A shows a plan view of a color unit of an FFS-LCD device in an embodiment of the invention.
Figure 4B:
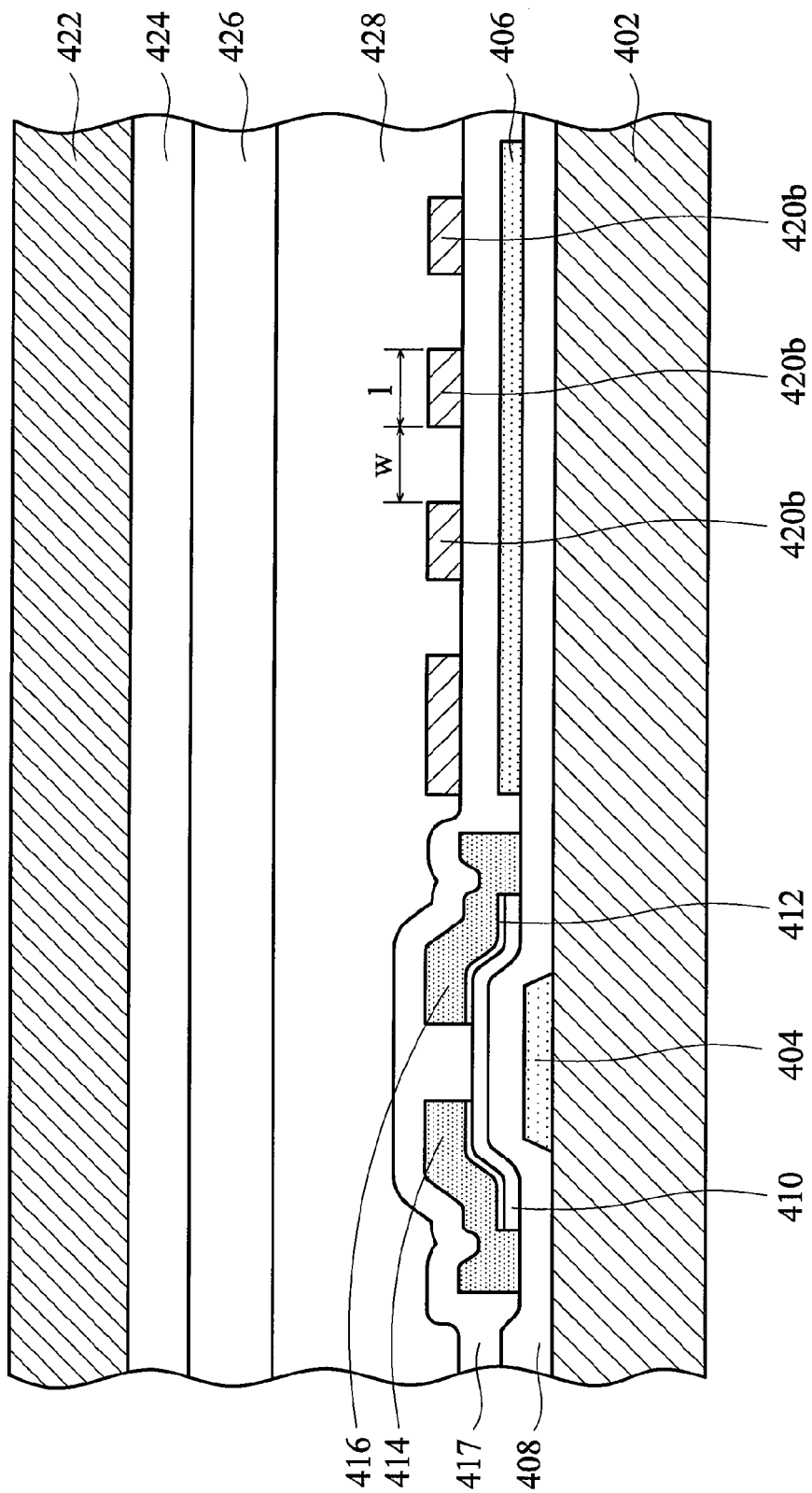
FIG. 4B shows a cross section along line I-I' of FIG. 4A.

FIG. 4A shows a plan view of a color unit 400 of an embodiment of an FFS-LCD device. FIG. 4B is a cross section along line I-I' of FIG. 4A. Referring to FIG. 4A and FIG. 4B, a first substrate 402 (also referred to as an array substrate) is provided. The first substrate 402 can be a glass substrate, and preferably is a low-alkali or non-alkali substrate. A first conductive layer, such as Mo, is deposited, and then patterned by photolithography to form a gate line 404. Next, a gate dielectric layer 408, such as silicon oxide or silicon oxynitride, is formed on the gate line 404 and the first substrate 402. A semiconductor layer 410, such as an amorphous silicon layer, and a doped semiconductor layer 412, such as an amorphous silicon layer doped with boron or phosphorus, is sequentially formed on the gate dielectric layer 408. Further, a transparent conductive layer, preferably ITO, is first deposited on the gate dielectric layer 408 and then pattered to form a common electrode 406 and a common electrode line 407. Thereafter, a second conductive layer is deposited on the doped semiconductor layer 412 and the gate dielectric layer 408, and then patterned by photolithography and etching to form a source electrode 414, a drain electrode 416 and data lines 418. Note that the gate line 404, the gate dielectric layer 408, the semiconductor layer 410, doped semiconductor layer 412, the source electrode 414 and the drain electrode 416 constitute a thin film transistor (TFT), and the orthogonally intersecting data lines and gate line 404 define a color unit 400 of the FFS-LCD device.

A passivation layer 417, such as silicon nitride, is conformally deposited on the source electrode 414, the drain electrode 416, the semiconductor layer 410 and the common electrode 406. A transparent conductive layer is deposited on the passivation layer 417, and then patterned by photolithography and etching to form a pixel electrode 420. In this embodiment the pixel electrode 420 comprise two electrode bars 420a parallel to the data lines 418 and a plurality of inclined electrode portions 420b, each having a width l, an angle θ from horizontal and separated with each other by a distance w. Two ends of each electrode portion 420b are separately connected to the two electrode bars 420a. The width l, the inclined angle θ and the separating distance w affect the operating voltage and/or transmittance of the FFS-LCD device.

A second substrate 422 (also referred to as a color filter substrate) is provided. A color filter layer 424, such as a photoresist, is formed on the inner surface of the second substrate 422. A coating layer 426, such as a transparent photoresist, is formed on the color filter layer 424. Next, liquid crystals are injected into a space between the first and second substrates to form a liquid crystal layer 428.

Figure 5A:
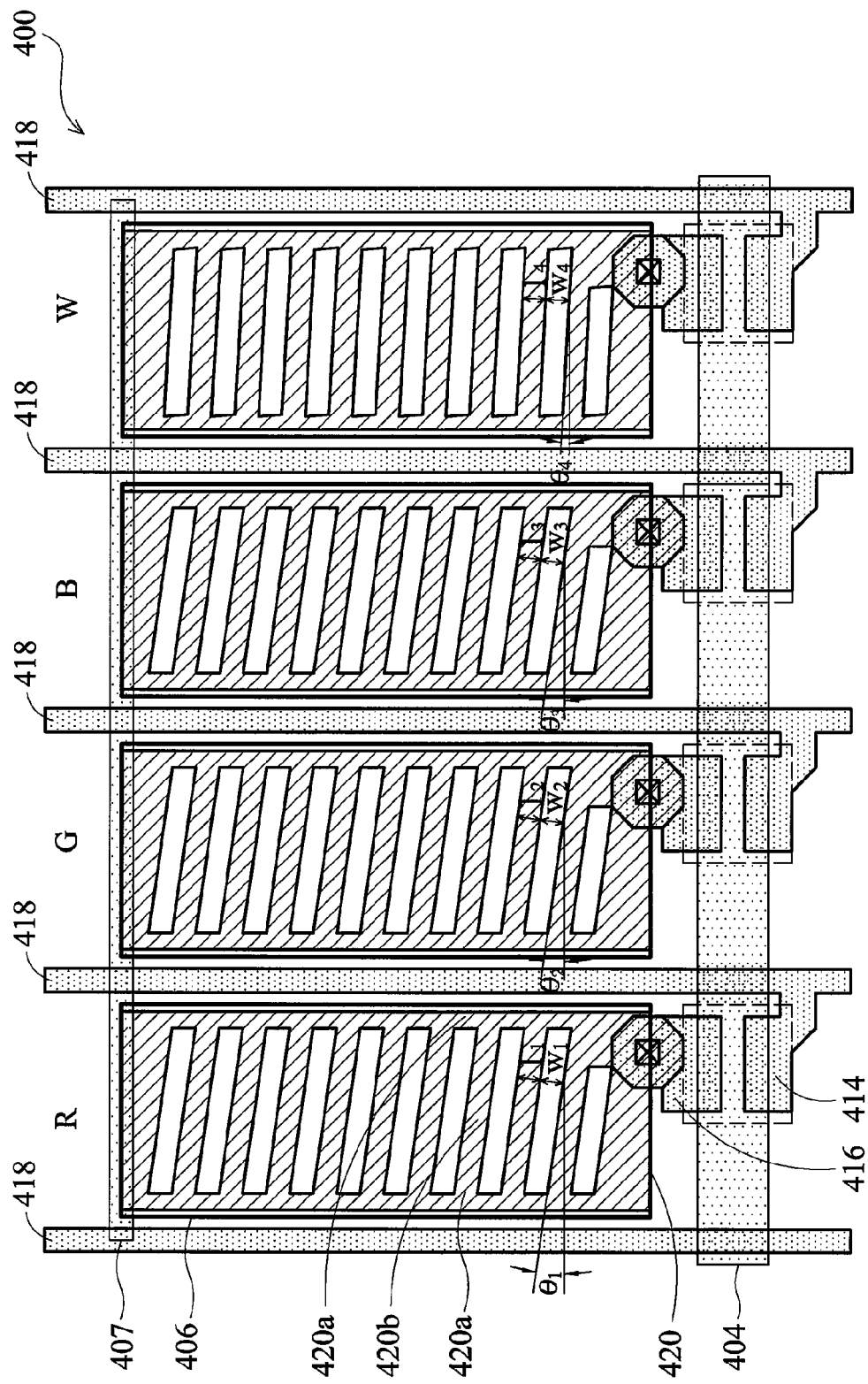
FIG. 5A shows a display unit comprising four color units of a FFS-LCD device of an embodiment of the invention.
Figure 5B:
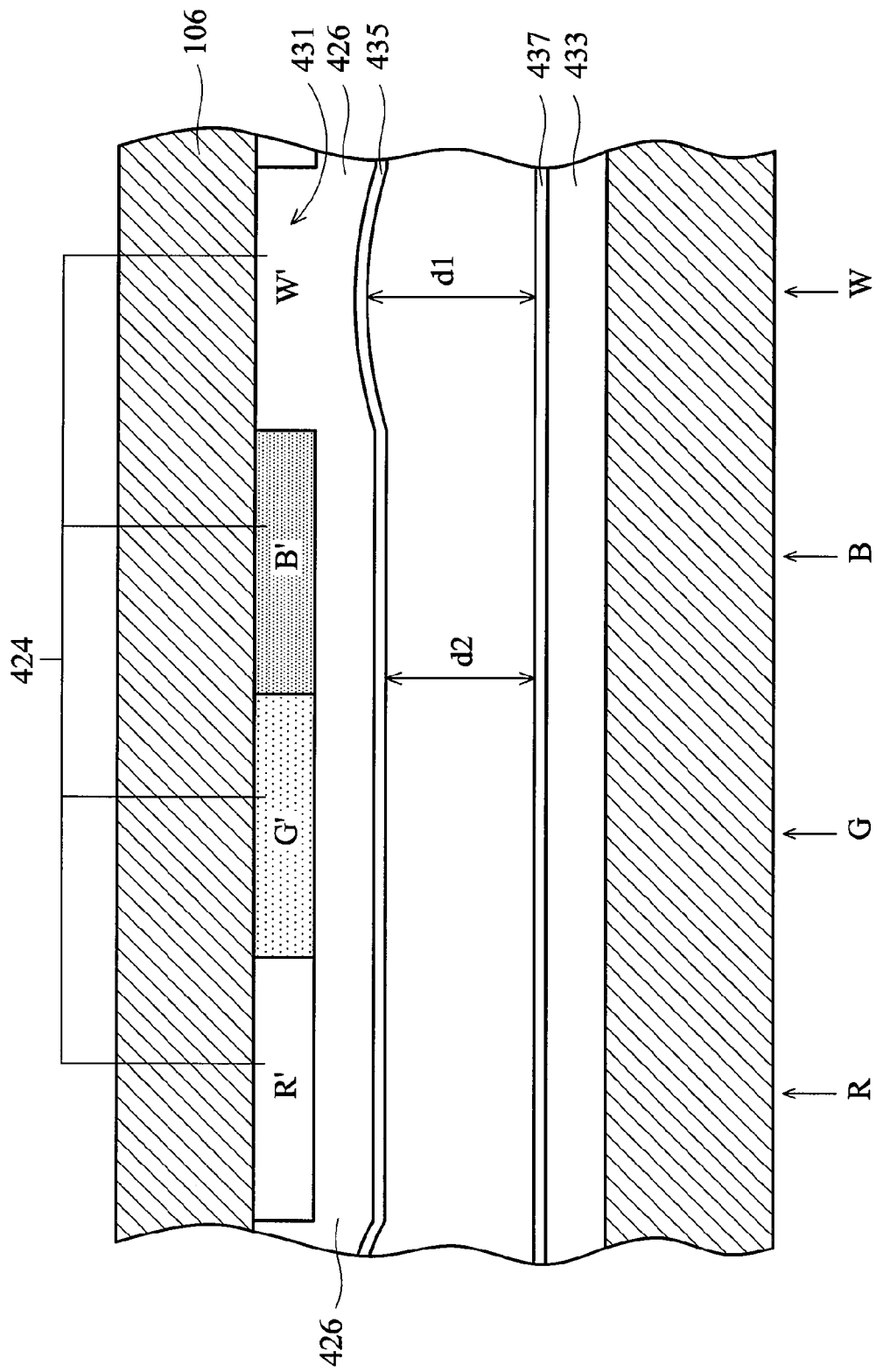
FIG. 5B shows a schematic cross section of FIG. 5A.

FIG. 4A and FIG. 4B show only one color unit. FIG. 5A shows a display unit 400 comprising four color units of an embodiment of an FFS-LCD device. FIG. 5B shows a schematic cross section of FIG. 5A. Note that the thin film transistor comprising the gate line 404, the gate dielectric layer 408, the source electrode 414, the drain electrode 416, and the pixel electrode 420 in FIG. 4B is referred to as active layer 433 in FIG. 5B for simplicity. In this embodiment, the display unit is a pixel, and the four color units are sub-pixels, the invention, however, is not limited to this. The color units can be pixels. In an exemplary example, the four sub-pixels comprise three major color sub-pixels and a white sub-pixel. Here, the three major color sub-pixels are illustrated as red sub-pixel R, green sub-pixel G and blue sub-pixel B, and the white unit as white sub-pixel W.

Referring to FIG. 5A and FIG. 5B, the red sub-pixel R, the green sub-pixel G, the blue sub-pixel B and the white sub-pixel W correspond to red resist patterns R', green resist patterns G', blue resist patterns B', and openings 431 are formed at locations predetermined to form white resist patterns. The coating layer 426 is formed on the blue, green and blue resist patterns R', G' and B', and fills the openings 431. Thus, a portion of the coating layer 426 in openings form white resist patterns W' of the color filter layer 424. As previously described, each sub-pixel electrode 420 comprises two electrode bars 420a parallel to the data line 418 and a plurality of inclined electrode portions 420b. Each inclined electrode portion 420b in the red sub-pixel R has a width $l_1$, an inclined angle $\theta_1$ and a separating distance $w_1$. Each inclined electrode portion 420b in the green sub-pixel G has a width $l_2$, an inclined angle $\theta_2$ and a separating distance $w_2$. Each inclined electrode portion 420b in the blue sub-pixel B has a width $l_3$, inclined angle $\theta_3$ and separating distance $w_3$. Each inclined electrode portion 420b in the white sub-pixel W has a width $l_4$, inclined angle $\theta_4$ and separating distance $w_4$.

Note that one photolithography step can be eliminated by the process of filling gaps to form white resist patterns W' of the color filter layer 424. Coating layer 426, however, sinks in the white sub-pixel W, thus, the cell gap d1 between the upper alignment layer 435 and the lower alignment layer 437 in the white sub-pixel W is larger than the cell gap d2 in the red sub-pixel R, green sub-pixel G and blue sub-pixel B. Due to the different cell gaps, the T-V curve of the LCD device is non-uniform. In order to address this issue, at least one of the separating distance $w_4$, the width $l_4$, and the angle $\theta_4$ of the inclined pixel electrode portions 420*b* in the white sub-pixel W are adjusted to compensate for the non-uniform T-V characteristics resulting from the different cell gap size. Accordingly, a uniform T-V curve can be achieved.

In the example shown in FIG. 5A, the sub-pixels R, G, B and W are arranged in a strip. The cell gap in the white sub-pixel W is larger than that in red, green and blue sub-pixels R, G and B. The inclined angles $\theta_4$ of pixel electrode portions 420*b* in the white sub-pixel W are adjusted for compensating the non-uniform transmittance versus voltage characteristics resulting from the different cell gap size. As shown in this figure, the inclined angle $\theta_4$ of pixel electrode portions 420*b* in the white sub-pixel W are different from those in the red, green and blue sub-pixels R, G and B.

Figure 6:
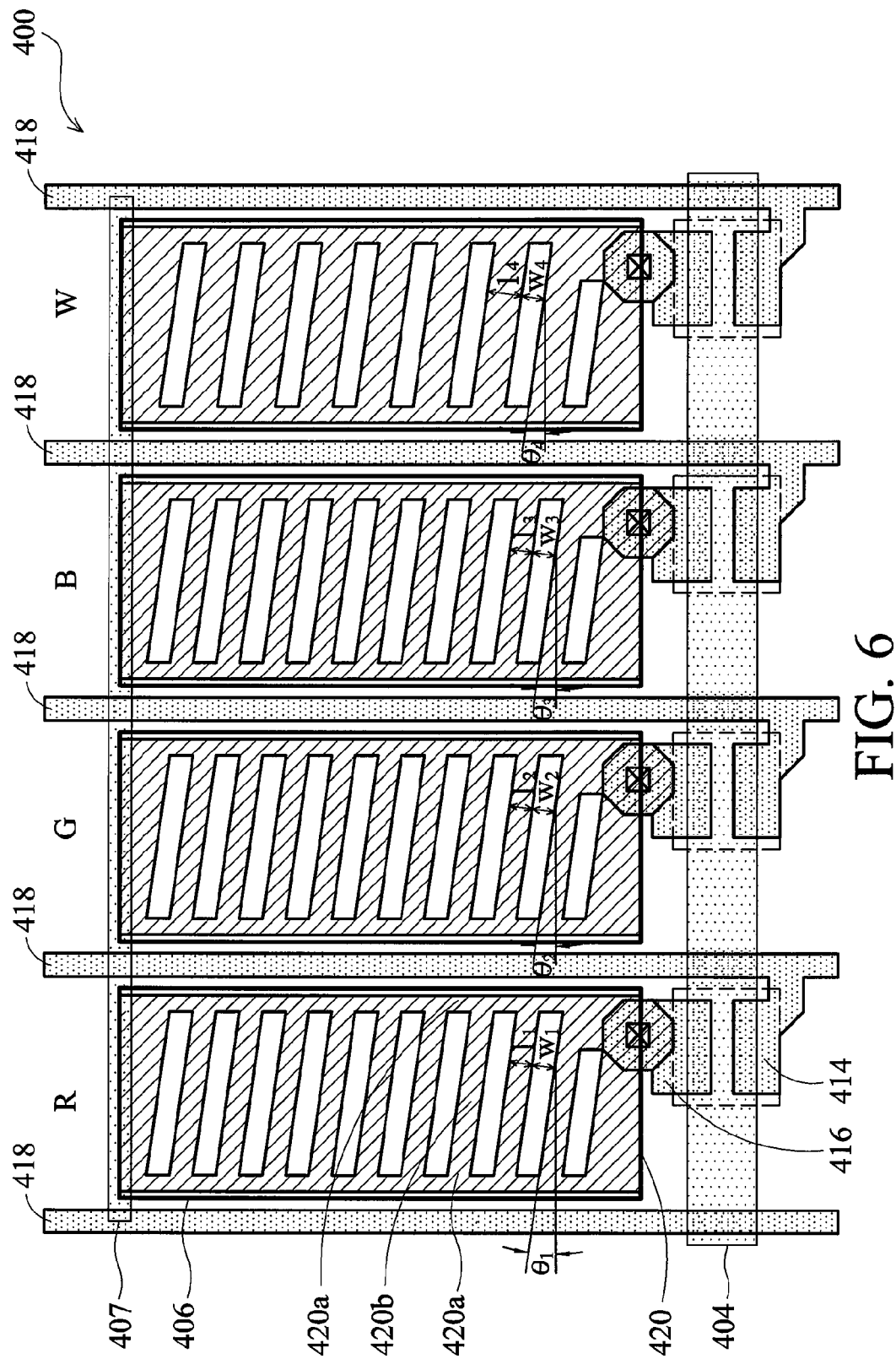
FIG. 6 shows a display unit of an embodiment of an FFS-LCD device of the invention.

In another example shown in FIG. 6, the sub-pixels R, G, B and W are arranged in a strip. The cell gap in the white sub-pixel W is larger than that in the red, green and blue sub-pixels R, G and B. The separating distances $w_4$ of pixel electrode portions 420*b* in the white sub-pixel W are adjusted for compensating the non-uniform transmittance versus voltage characteristics resulting from the different cell gap size. As shown in this figure, the separating distances $w_4$ of pixel electrode portions 420*b* in the white sub-pixel W are different from those in the red, green and blue sub-pixels R, G and B.

Figure 7:
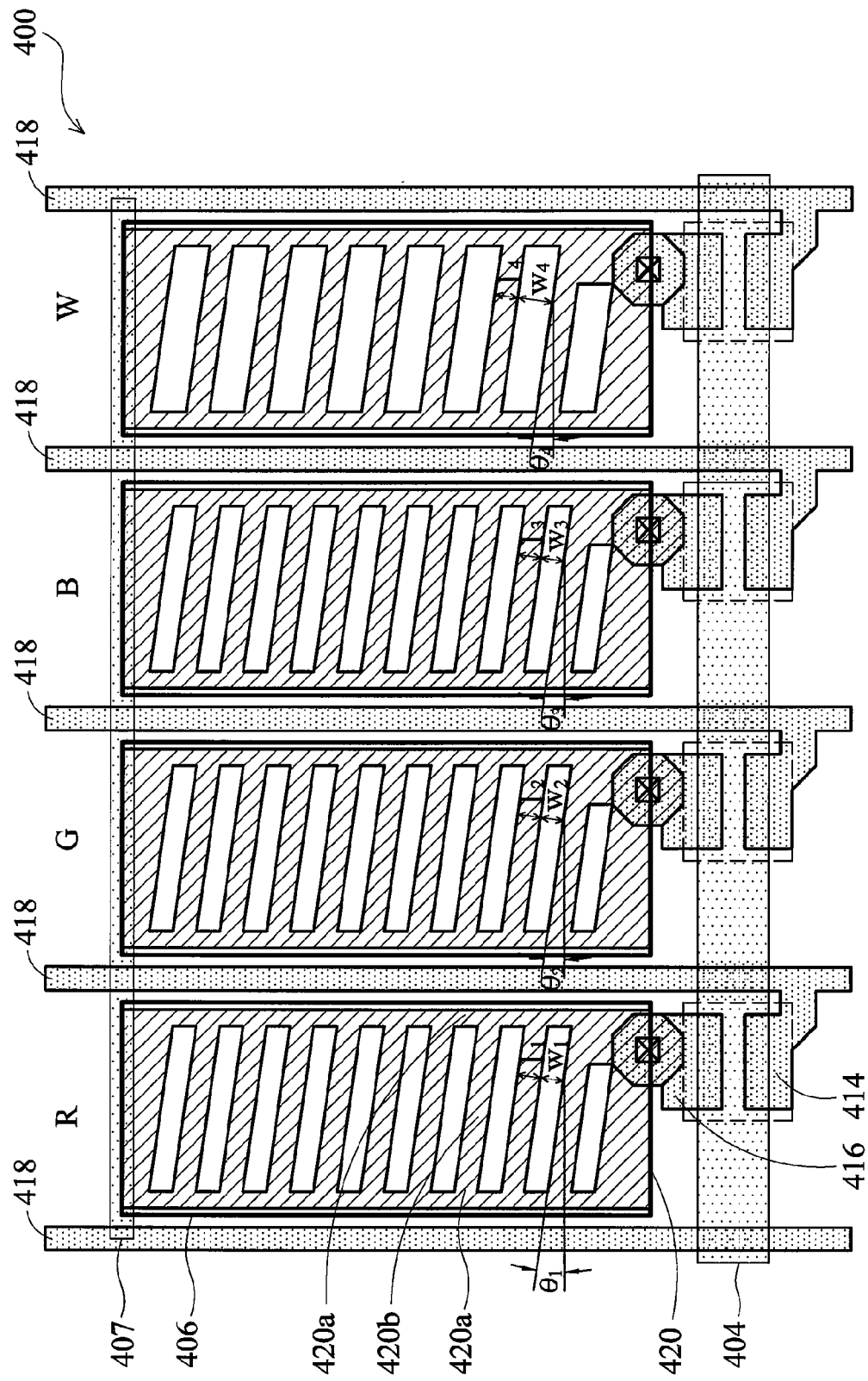
FIG. 7 shows a display unit of an embodiment of an FFS-LCD device of the invention.

In another example shown in FIG. 7, the sub-pixels R, G, B and W are arranged in a strip. The cell gap in the white sub-pixel W is larger than that in red, green and blue sub-pixels R, G and B. The separating distance $w_4$ of pixel electrode portions 420*b* in the white sub-pixel W are adjusted for compensating the non-uniform transmittance versus voltage characteristics resulting from the different cell gap size. As shown in this figure, the separating distance $w_4$ of pixel electrode portions 420*b* in the white sub-pixel W are different from those in the red, green and blue sub-pixels R, G and B.

Figure 8:
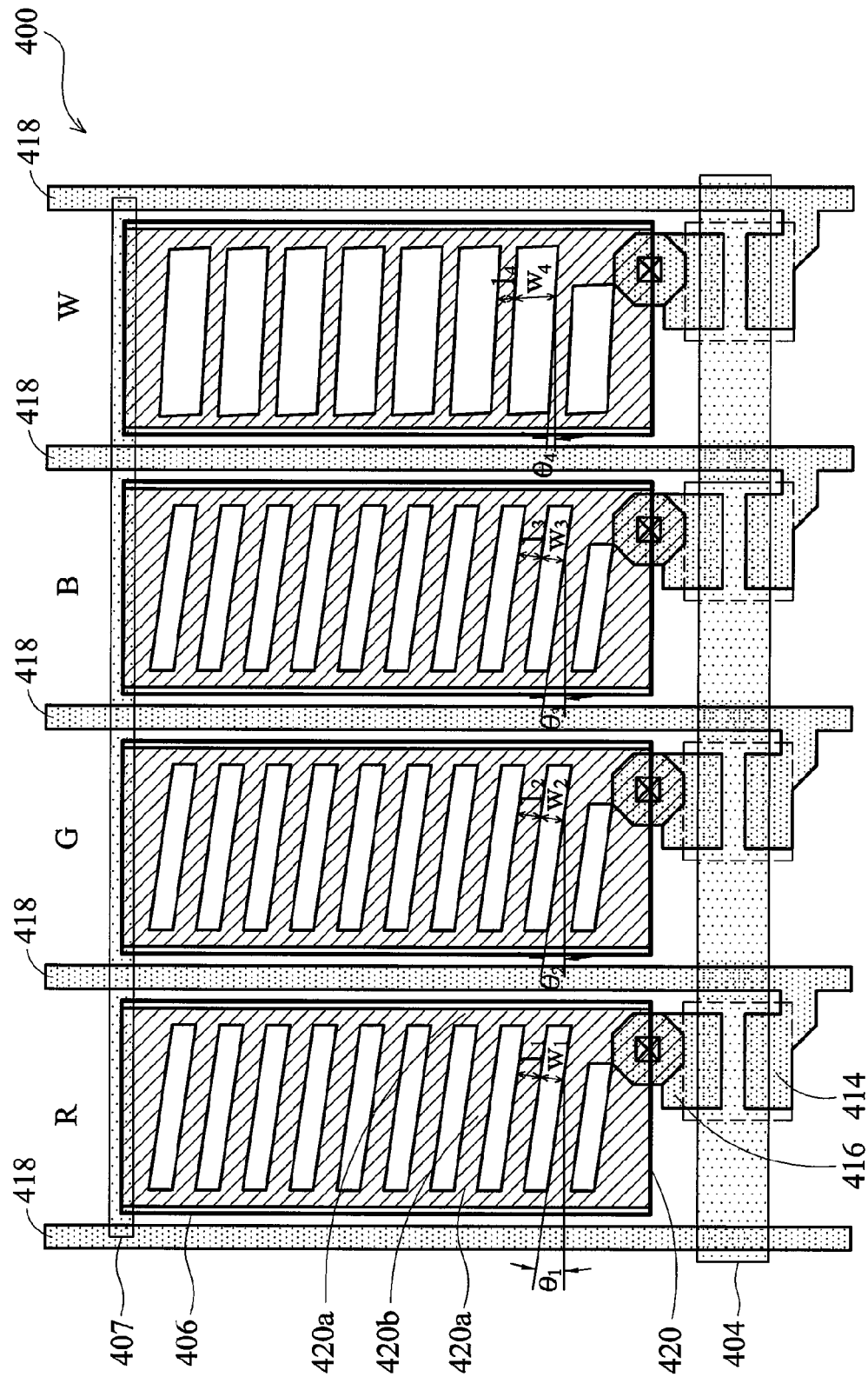
FIG. 8 shows a display unit of an embodiment of an FFS-LCD device of the invention.

In another example shown in FIG. 8, the sub-pixels R, G, B and W are arranged in a strip. The cell gap in the white sub-pixel W is larger than that in red, green and blue sub-pixels R, G and B. The inclined angles $\theta_4$, the separating distances $w_4$ and the separating distance $w_4$ of the pixel electrode portions 420*b* in the white sub-pixel W are adjusted for compensating the non-uniform transmittance versus voltage characteristics resulting from the different cell gap size. As shown in this figure, the inclined angle $\theta_4$, the widths $l_4$ and the separating distances $w_4$ of pixel electrode portions 420*b* in the white sub-pixel W are different from those in the red, green and blue sub-pixels R, G and B.

Figure 9A:
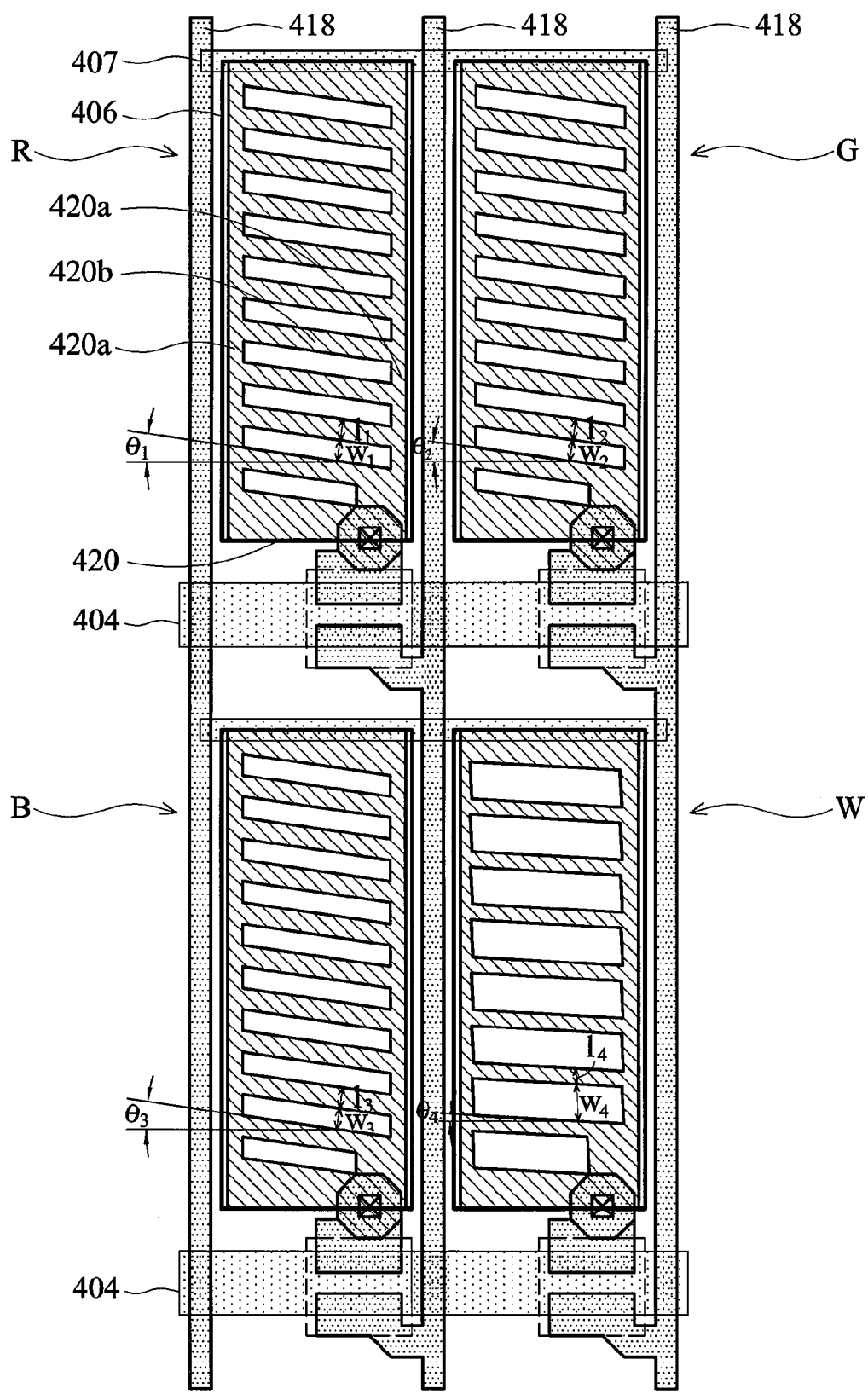
FIG. 9A shows a display unit of an embodiment of an FFS-LCD device of the invention.

In another example shown in FIG. 9A, the sub-pixels R, G, B and W are arranged in a rectangle. The cell gap in the white sub-pixel W is larger than that in the red, green and blue sub-pixels R, G and B. The inclined angles $\theta_4$, the widths $l_4$ and the separating distances $w_4$ of the pixel electrode portions 420*b* in the white sub-pixel W are adjusted for compensating the non-uniform transmittance versus voltage characteristics resulting the different cell gap size. As shown in this figure, the inclined angle $\theta_4$, the widths $l_4$ and the separating distances $w_4$ of pixel electrode portions 420*b* in the white sub-pixel W are different from those in the red, green and blue sub-pixels R, G and B.

Figure 9B:
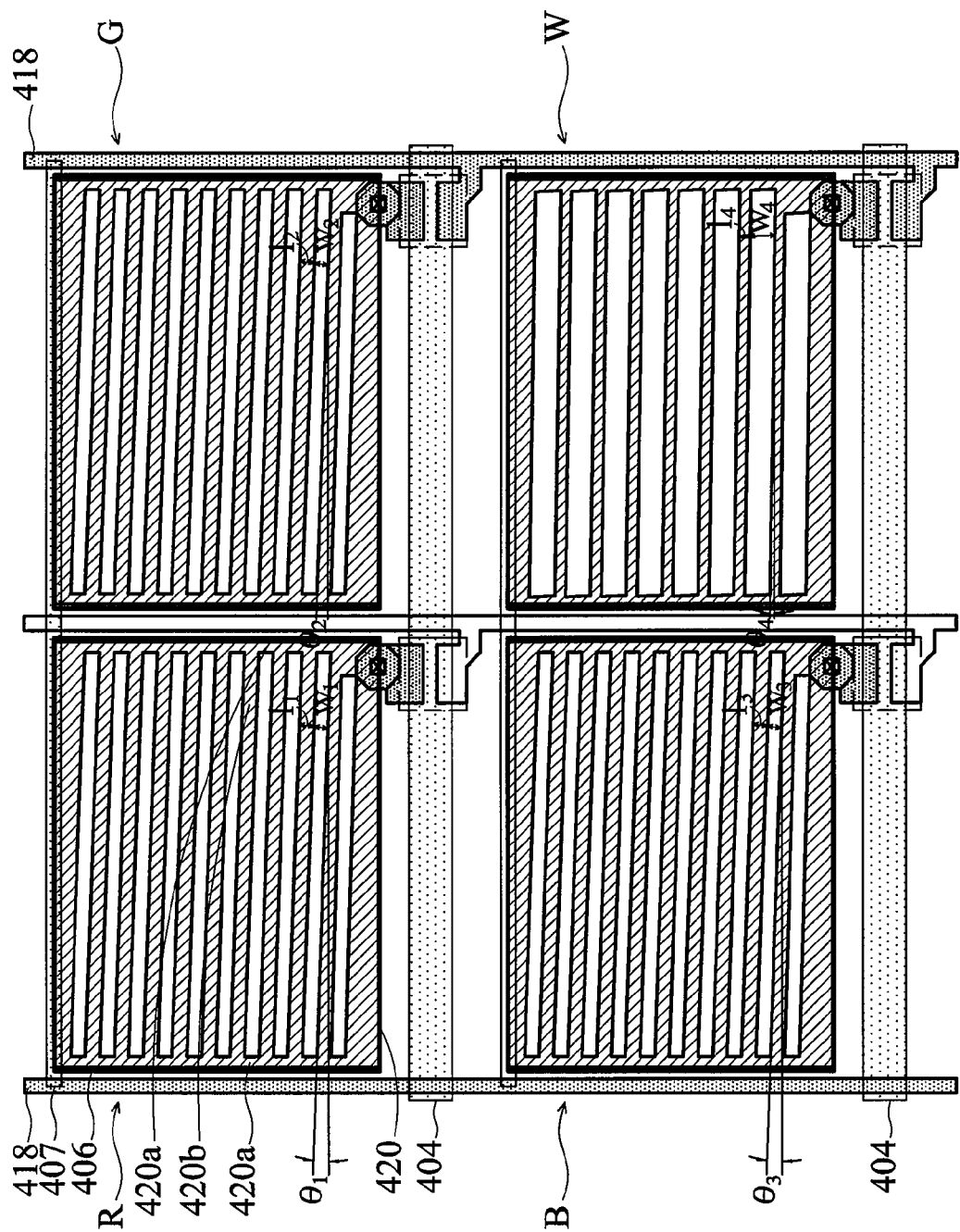
FIG. 9B shows a display unit of an embodiment of an FFS-LCD device of the invention.

In further another example shown in FIG. 9B, the sub-pixels R, G, B and W are arranged in a square. The cell gap in the white sub-pixel W is larger than that in the red, green and blue sub-pixels R, G and B. The inclined angles $\theta_4$, the widths $l_4$ and the separating distances $w_4$ of the pixel electrode portions 420*b* in the white sub-pixel W are adjusted for compensating the non-uniform transmittance versus voltage characteristics resulting the different cell gap size. As shown in this figure, the inclined angle $\theta_4$, the widths $l_4$ and the separating distances $w_4$ of pixel electrode portions 420*b* in the white sub-pixel W are different from those in the red, green and blue sub-pixels R, G and B.

In some embodiments the color units can be pixels, in which sub-pixel rendering is implemented on the display device 400. For clarity, the sub-pixel rendering technology is not illustrated in detail herein. U.S. Pat. No. 7,068,287, U.S. Pat. No. 7,084,923, and U.S. Pat. No. 7,110,012 are incorporated by reference.

Note that the invention is not limited to the embodiments described. The inclined angle $\theta_4$ and the separating distances $w_4$ of pixel electrode portions 420*b* in the white sub-pixel W can be adjusted to differ from those in the red sub-pixel, the green sub-pixel and the blue sub-pixel for achieving uniform transmittance-voltage curves. Alternatively, the inclined angle $\theta_4$ and the separating distance $w_4$ of pixel electrode portions 420*b* in the white sub-pixel W can be adjusted to differ from those in the red sub-pixel, the green sub-pixel and the blue sub-pixel for achieving uniform transmittance-voltage curves. In addition, the widths $l_4$ and the separating distances $w_4$ of pixel electrode portions 420*b* in the white sub-pixel W can be adjusted to differ from those in the red sub-pixel, the green sub-pixel, and the blue sub-pixel for achieving uniform transmittance-voltage curves. Further, arrangements of the sub-pixels are not limited to the described embodiments, they can also be arranged as a rectangle, mosaic, or checkerboard.

Figure 2:
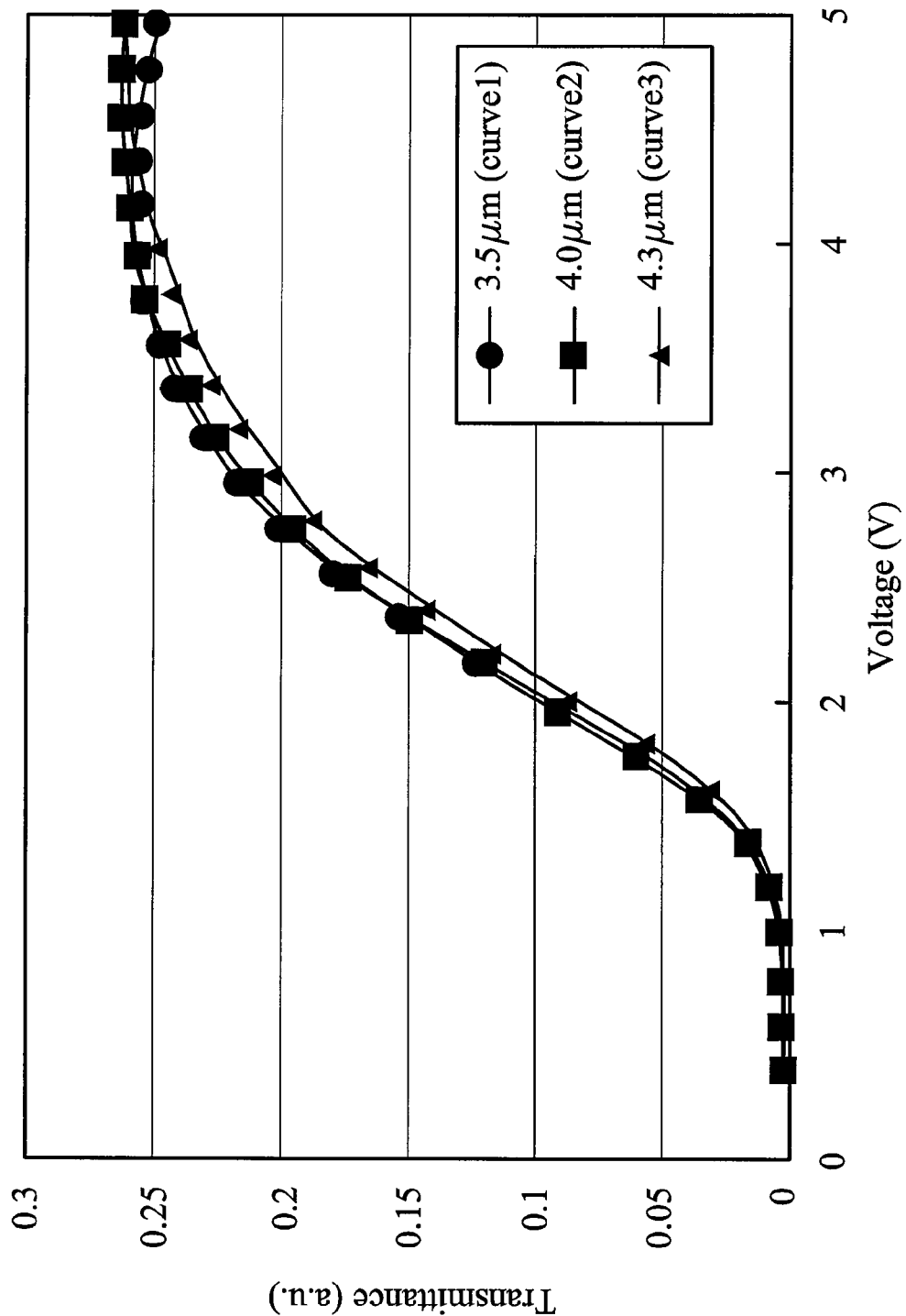
FIG. 2 is a T-V diagram of conventional RGBW LCDs.
Figure 3:
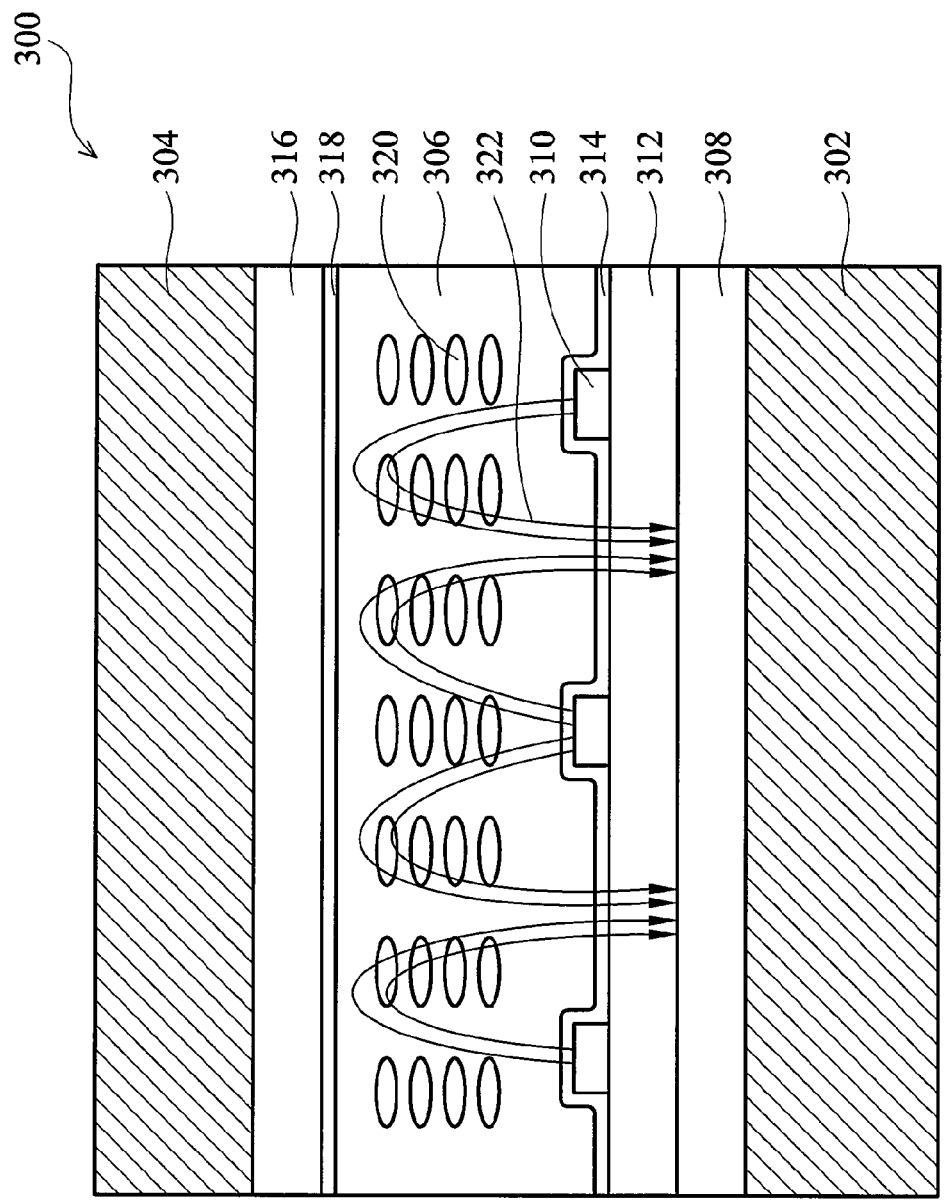
FIG. 3 shows a cross section of a conventional fringe field switching liquid crystal display (FFS-LCD) device.
Figure 10:
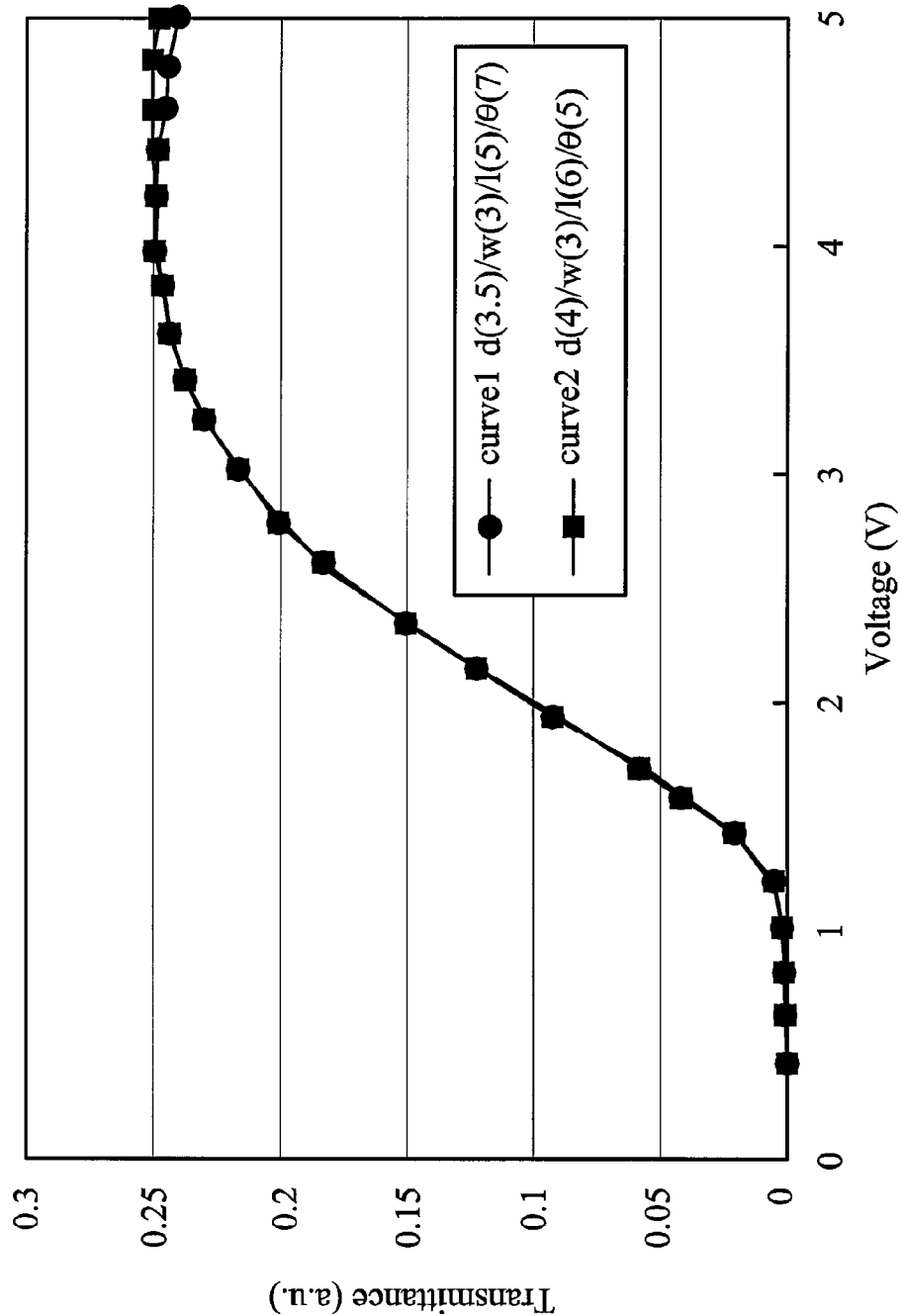
FIG. 10 is a T-V diagram, showing a simulation result of the invention.

FIG. 10 is a T-V diagram, showing a simulation result. The diagram of FIG. 10 can be compared with the diagram of FIG. 2. In FIG. 2, curve 1 has a cell gap 3.5 μm and curve 2 has a cell gap 4.0 μm, and each presents different transmittance versus voltage characteristics. In FIG. 10, the widths of the electrode portions of the pixel electrodes are the same as FIG. 2. The separating distances of the electrode portions of the pixel electrodes in the white sub-pixel W are increased from 5 μm of curve 1 to 6 μm of curve 2, and the inclined angles θ thereof are decreased from 7° of curve 1 to 5° of curve 2 for compensating the non-uniform transmittance versus voltage characteristics resulting from variance of the cell gap. As shown in FIG. 10, though curve 1 and curve 2 have difference cell gap, the curves are substantially matched by adjusting the widths and/or the separating distances of pixel electrode portions in the white sub-pixel W.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
    a first substrate and a second substrate corresponding to each other;
    a plurality of first common electrode and a second common electrode arranged on the first substrate;
    a plurality of first pixel electrodes and a second pixel electrode corresponding to the first common electrodes and the second common electrode separately, and each of the pixel electrode including a plurality of electrode portions having a width l, tilted an angle θ, and separated by a distance w; and a plurality of first color units and a second color unit arranged on the second substrate and corresponding to the first pixel electrodes and the second pixel electrode separately;

wherein the width of a plurality of electrode portions in the first color units is different from that in the second color unit, wherein the second color unit is white color unit, wherein the first color units and the second color units are the same size.

2. The liquid crystal display as claimed in claim 1, wherein one of the first color units is selected from the group consisting of a red color unit, a green color unit, and a blue color unit.

3. The liquid crystal display as claimed in claim 1, wherein the second color unit having a sink.

4. The liquid crystal display as claimed in claim 3, wherein the sink is filled with a transparent material.

5. The liquid crystal display as claimed in claim 1, wherein the distance w in the first color units are different from those in the second color unit.

6. The liquid crystal display as claimed in claim 1, wherein the distance w and the angle θ in the first color units are different from those in the second color unit.

7. The liquid crystal display as claimed in claim 1, wherein the angle θ in the first color units are different from those in the second color unit.

8. The liquid crystal display as claimed in claim 1, wherein ends of the electrode portions are connected to each other.

9. The liquid crystal display as claimed in claim 1, wherein the first color units and the second color unit is arranged in a strip, triangle, rectangle, square, mosaic or checkerboard.

10. The liquid crystal display as claimed in claim 1, further characters a first transmittance-voltage curve corresponding to the first color units and a second transmittance-voltage curve corresponding to the second color units.

11. The liquid crystal display as claimed in claim 1, wherein the width l in the second color unit is adjusted for achieving similar first and second transmittance-voltage curves.

12. The liquid crystal display as claimed in claim 1, wherein the distance w in the second color unit is adjusted for achieving similar first and second transmittance-voltage curves.

13. The liquid crystal display as claimed in claim 1, wherein the angle θ in the second color unit is adjusted for achieving similar first and second transmittance-voltage curves.

14. The liquid crystal display as claimed in claim 1, further comprising a first alignment layer disposed on the first substrate.

15. The liquid crystal display as claimed in claim 1, further comprising a second alignment layer disposed on the second substrate.

16. The liquid crystal display as claimed in claim 1, further comprising a coating layer disposed overlying the first color units and the second color unit.

17. The liquid crystal display as claimed in claim 1, further comprising a first cell gap between the first pixel electrodes and the coating layer and a second cell gap between the second pixel electrode and the coating layer.

18. The liquid crystal display as claimed in claim 17, wherein the second cell gap is larger than the first cell gap.

19. The liquid crystal display as claimed in claim 1, wherein the first pixel electrodes and the second pixel electrode are arranged on the first substrate.

* * * * *